United States Patent [19]
Tsue et al.

[11] Patent Number: 5,943,897
[45] Date of Patent: Aug. 31, 1999

[54] METHOD FOR MAKING A HOLE IN A PLATE AND A PUNCH FOR MAKING SUCH A HOLE

[75] Inventors: Hiroshi Tsue; Hiroyuki Iwata, both of Neyagawa, Japan

[73] Assignee: Exedy Corporation, Neyagawa, Japan

[21] Appl. No.: 09/069,331

[22] Filed: Apr. 29, 1998

[30] Foreign Application Priority Data

Apr. 30, 1997 [JP] Japan ................................... 9-112361
Apr. 30, 1997 [JP] Japan ................................... 9-112362

[51] Int. Cl.⁶ ............................ B21D 28/14; B21D 28/26
[52] U.S. Cl. ................................................................. 72/335
[58] Field of Search ........................... 72/335, 333, 327, 72/336, 324

[56] References Cited

U.S. PATENT DOCUMENTS

| | | | |
|---|---|---|---|
| 2,377,558 | 6/1945 | Johnson | 72/399 |
| 3,434,327 | 3/1969 | Speakman | 72/335 |
| 3,741,141 | 6/1973 | Diekhoff | 72/335 |
| 4,248,075 | 2/1981 | Whitley | 72/335 |

FOREIGN PATENT DOCUMENTS

| | | | |
|---|---|---|---|
| 493562 | 3/1930 | Germany | 29/163.6 |
| 165531 | 12/1981 | Japan | 72/379 |
| 137529 | 7/1985 | Japan | 72/335 |
| 65802 | 2/1943 | Norway | 72/335 |
| 1291247 | 2/1987 | U.S.S.R. | 72/335 |

*Primary Examiner*—Daniel C. Crane
*Attorney, Agent, or Firm*—Shinjyu An Intellectual Propery Firm

[57] ABSTRACT

The present invention relates to a method for making an oil passing hole in a plate where the plate is first provided with a pre-formed hole having a first diameter. A punch having a guiding part with a diameter smaller than the first diameter is inserted into the pre-formed hole. The punch also includes pressing part which is larger than the first diameter. The pressing part engages the plate as the guiding part extends into the pre-formed hole. Force applied by the pressing part causes portions of the plate to deform resulting in plastic flow of the portions of the plate. The plastic flow is in a radially inward direction causing portions of the plate to surround and engage the guiding part forming the oil passing hole which has a second diameter that is smaller than the first diameter.

14 Claims, 10 Drawing Sheets

METHOD FOR MAKING A HOLE IN A PLATE AND A PUNCH FOR MAKING SUCH A HOLE

BACKGROUND OF THE INVENTION

A. Field of the Invention

The present invention relates to the method for making a small hole in a plate member that is employed in fluid flow regulating applications, such as in an automatic transmission, and the invention further relates to the plate member having such a hole formed therein.

B. Description of the Related Art

A control valve body which is used in an automatic transmission of an automobile has a structure similar to that shown in FIG. 3. In FIG. 3, an upper body 2 and lower body 3 of the valve body 1 are connected to one another with a separate plate 5 interposed therebetween. Channels are formed in the bodies 2 and 3 defining oil passages 6 and 7, respectively. The separate plate 5 is attached to the upper body 2 and the lower body 3 tightly in a liquid-sealed condition. The separate plate 5 has a plurality of oil passing holes 9 formed therein, but only one oil passing hole 9 is shown in FIG. 3 connecting the oil passages 6 and 7. The diameter of the oil passing hole 9 and the flatness of the plate surface at the edge of the oil passing hole 9 are important for proper fluid regulating characteristics of the oil passing hole 9 of the separate plate 5.

The oil passing hole 9 has a predetermined diameter and is typically formed by press working the separate plate 5 using a punch, such as a punch 10 shown in FIG. 4.

There are problems associated with the hole forming processes in the above described separate plate 5. When the thickness T of the plate 5 is small, for example, 2 mm, and the diameter D of the oil passing hole is less than 50% of the thickness T (less than 1 mm), a swollen part 11 is generated during press working. The swollen part 11 is generated by deformation of metal during the hole making procedure using the punch 10. The swollen part 11 is usually formed on the side of the plate 5 where the punch 10 first engages the plate 5 in the hole forming process. Since the hole 9 is round and the swollen part 11 is formed all around the hole 9, the swollen part has an annular shape on the surface 12. Occasionally a similar swollen part is formed on the under surface 13 resulting in, for instance, a flash 14 being formed on an under surface, the under surface being a surface that the punch 10 moves through after completely extending through the plate 5 during the hole forming process.

If the control valve body is assembled and includes the plate 5 where the plate 5 includes the swollen part 11, the liquid-tightness of the oil passages 6 and 7 is reduced because the upper body 2 and the lower body 3 may engage the swollen part 11 thus making fluid leaks possible.

In addition, the process as shown in FIG. 4 has a drawback. Specifically, a ratio is defined between the diameter D and the thickness T of the plate 5. If the ratio is very small, where the thickness T is much greater than the diameter D, then punch 10 might not be able to withstand the forces necessary to punch through the plate 5. In other words, the punch 10 might break if the ratio is very small. Therefore, with a large thickness T and a relatively small diameter D, the punch 10 does not have a long usable life.

Another example of a portion of control valve body for an automobile automatic transmission as shown in FIG. 14. As with the previous example above, in FIG. 14, an upper body 2 and lower body 3 of a valve body 1 are connected to one another with a separate plate 105 interposed therebtween. Again, channels are formed in the bodies 2 and 3 which define oil passages 6 and 7. The separate plate 105 is connected with the upper body 2 and lower body 3 in a liquid-tight condition and a plurality of oil passing holes 109 are formed therein. Only one hole 109 is shown in the plate 105 connecting the oil passages 6 and 7 in FIG. 14.

Depending on the specific functions of control valve body, the oil passing hole 109 may include a taper face 111, as shown in FIG. 14. In detail, the inner circumferential face of the oil passing hole 109 includes the taper face 111 which has an outer edge 110 and an inner edge 112. The outer edge 110 defines a diameter that is much larger than the diameter of the inner edge 112 and the hole 109 itself. Further, the hole 109 defines an inner cylinder surface 113 that extends from the inner edge 112 to the under side of the plate 105. The taper face 111 is an inclined surface with a generally conical shape overall. The taper face 111 is often necessary when putting a ball or check valve in place above the taper face 111.

Since the oil passing hole 109 with the taper described above is required to have a precise predetermined size, it is often formed by utilizing a counter sink drill. Such a drilling method has a drawback in that productivity is low because the drilling process takes a significant amount of time, in particular when large quantities of the plate 105 must be produced.

Further, when the taper surface 111 is made by press working, productivity may be increased but a variety of additional drawbacks accompany the increase in productivity.

As shown in FIG. 15, the oil passing hole 109 is made by press working. First, a raw plate material (which later forms the separate plate 105) is held between upper and lower die plates 115 and 116. A guiding hole is formed in the plate material (the hole later becomes the hole 109). The taper surface 111 is made by plastic working the raw material using a punch 117 which is forced into the guiding hole of the die plate 115.

The punch 117 has a taper part 118 with a taper surface corresponding to the taper face 111, and a column-like protrusion 119 to form a cylinder surface 113 projects from the end of the taper part 118. The taper part 118 extends in a taper to the outer circumferential surface of the punch 117, and an outer diameter of a large diameter base part 120 of the punch 117 is much larger than an outer diameter of a large diameter edge 110 of the taper surface 111 of the oil passing hole 109. Therefore, an annular gap 122 with a triangle cross section is defined around the oil passing hole 109 between the base part 120 of the taper part 118 and the upper surface 121 of the separate plate 105. As the result, the press working deformation causes a movement of the material and a swelling part 125 is formed on the upper surface 121 around the oil passing hole 109.

A movement of the material is also caused on the lower surface 127 of the separate plate 105 and a swelling part 126 is formed around the oil passing hole 9. The swelling part 126 is generated as a result of elastic deformation caused by the upper end surface of the die plate 116. It is also found, as shown in FIG. 15, that the swelling parts 25 and 26 tend to be generated when an open angle Θ of the punch 117 is greater than 80° and the ratio (M/T) of a depth M of the taper surface 111 and a thickness T of the separate plate 105 is more than 0.5.

Such swelling parts 125 and 126 cause a deviation of flow characteristics of oil in a valve in FIG. 14. Consequently, it sometimes happens that the desired characteristics of sitting on the bearing surface can not be obtained when the taper surface 111 is used as a bearing surface for a ball valve.

In addition, when a gasket 128 is interposed both between the upper body 2 and the separate plate 105, and another gasket 128 is interposed between the lower body 3 and the separate plate 105 as shown in FIG. 16, the swelling parts 125 and 126 make an indentation in the gasket 128. Therefore, there is a possibility that sealing capabilities of the gasket 28 may be compromised.

It should be noted that in the above discussed drawings, the swelling parts have been exaggerated somewhat in order to better demonstrate the shortcomings of the prior art and in actual examples may not have the depicted size when compared to the overall thickness of the plate member.

SUMMARY OF THE INVENTION

One object of the present invention is to prevent the formation of swelling on a surface adjacent to an outer circumference of the plate hole.

Another object of the present invention is to reduce the force per square inch that must be endured by a punch during a hole making process where such a hole has a relatively small diameter with respect to the thickness of a plate.

In accordance with one aspect of the present invention, a there is a method for making a hole a plate. The method includes the steps of providing a first hole in a plate material, the first hole having a first diameter. Next, portions of the plate material surrounding the first hole are deformed with a punch such that the portions of the plate material surrounding the first hole plastically flow radially inward with respect to the first hole, thus forming a second hole having a second diameter. The second diameter is smaller that the first diameter.

Preferably, in the second step, a guiding part of the punch is inserted into the first hole. The guiding part of the punch has a cylindrical shape having a diameter generally corresponding to the second diameter such that as the portions of the plate material surrounding the first hole plastically flow radially inward, the portions of the plate material contact and surround the guide part to form a portion of the second hole.

Preferably, the diameter of the guiding part is less than 50% of a thickness of the plate material.

Preferably, in the second step an annular portion of the plate material is deformed such that a thickness of the plate material of the annular portion is reduced forming an annular indentation about the previously mentioned portions of the plate material. The annular indentation is formed by a column part that is concentrically formed radially outward from the guiding part on the punch.

Preferably, in the second step portions of the plate material surrounding the guiding part are formed with an inclined surface having a generally conical shape and the punch is formed with a complimentary conical surface about the guiding part for forming the inclined surface.

Preferably, in the second step portions of the plate material surrounding the guiding part are formed with an annular spherically shaped surface having a generally concave shape and the punch is formed with a complimentary spherical surface about the guiding part for forming the annular spherically shaped surface.

Preferably, in the second step portions of the plate material surrounding the guiding part are formed with a curved annular shaped surface having a generally rounded shape and the punch is formed with a complimentary rounded surface about the guiding part for forming the curved annular shaped surface.

In accordance with another aspect of the present invention, a plate includes a plate body formed with at least one a hole extending completely through the plate body from an upper surface to a lower surface thereof. The hole has a diameter that is less than 50% of the thickness of the plate body. An annularly shaped indentation is formed in the upper and lower surfaces of the plate body about the hole and concentric with the hole. The plate body has a generally constant, uniform thickness apart from the annular shaped indentation and the hole.

Preferably, the plate further includes a conical shaped surface formed between the indentation and the hole. The conical shaped surface is configured such that a thickness of a portion of the plate body about the hole is less than a thickness of another portion of the plate body within the annularly shaped indentation.

Preferably, the plate may alternatively include a spherically shaped surface formed between the indentation and the hole. The spherically shaped surface configured such that a thickness of a portion of the plate body about the hole is less than a thickness of another portion of the plate body within the annularly shaped indentation.

Alternatively, the plate may include a curved annular shaped surface formed between the indentation and the hole, the curved annular shaped surface configured such that a thickness of a portion of the plate body about the hole is less than a thickness of another portion of the plate body within the annularly shaped indentation.

In accordance with another aspect of the present invention, a punch includes a generally cylindrically shaped pressing part having an annular flat surface at a bottom portion thereof. A guiding part has a generally cylindrical shape and extends downward from the pressing part and is concentric with the pressing part. The pressing part is configured to engage a surface of a plate member adjacent to a pre-existing hole having a first diameter. The guiding part is configured for inserted into the pre-existing prepared hole such that in response to force being applied by the pressing part onto the plate member, portions of the plate member are deformed and plastically flow radially inward into engagement with the guiding part forming a hole having a second diameter smaller than the first diameter.

The punch may also include a conical shaped portion that is formed about the guiding part. A surface of the conical shaped portion extends from the guiding part to the pressing part such that the conical shaped portion is configured to form a complimentary conical shaped surface on the plate member radially outside the hole having the second diameter.

The punch may alternatively include a spherical shaped portion formed about the guiding part. A surface of the spherical shaped portion extends from the guiding part to the pressing part such that the spherical shaped portion is configured to form a complimentary spherical shaped surface on the plate member radially outside the hole having the second diameter.

The punch may also alternatively include a rounded annular shaped portion formed about the guiding part. A surface of the rounded annular shaped portion extends from the guiding part to the pressing part such that the rounded annular shaped portion is configured to form a complimentary rounded shaped annular surface on the plate member radially outside the hole having the second diameter.

A punch used in accordance with the present invention is less likely to break when compared to prior art configurations since the force per square inch applied by such a punch is reduced. Further, the plate member having the holes formed in accordance with the present invention are configured to provide a better fluid seal when assembled with corresponding valve members.

These and other objects, features, aspects and advantages of the present invention will become more fully apparent from the following detailed description of the present invention when taken in conjunction with the accompanying drawings where like reference numerals denote corresponding parts throughout the accompanying drawings.

DETAILED DESCRIPTION OF THE PREFERRED EMBODIMENTS

First Embodiment

Figure 1:
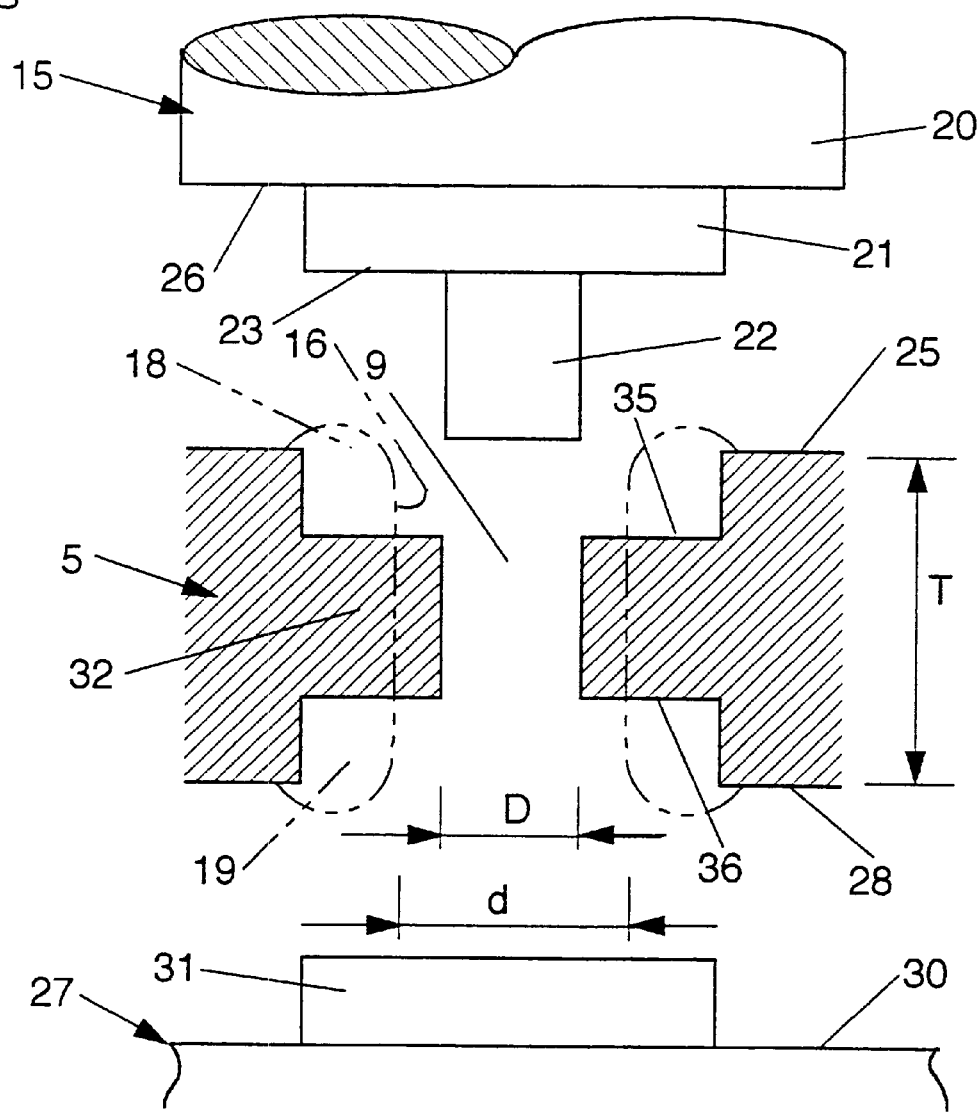
FIG. 1 is a fragmentary, part cross section, part elevational view showing a punch and die used in a method to make an oil passing hole in a plate in accordance with a first embodiment of the present invention.

FIG. 1 shows features relating to a method to form an oil passing hole 69 with a small diameter in a plate 65 using a punch 15 in accordance with a first embodiment of the present invention.

A First Step In Making Hole In A Plate

Figure 4:
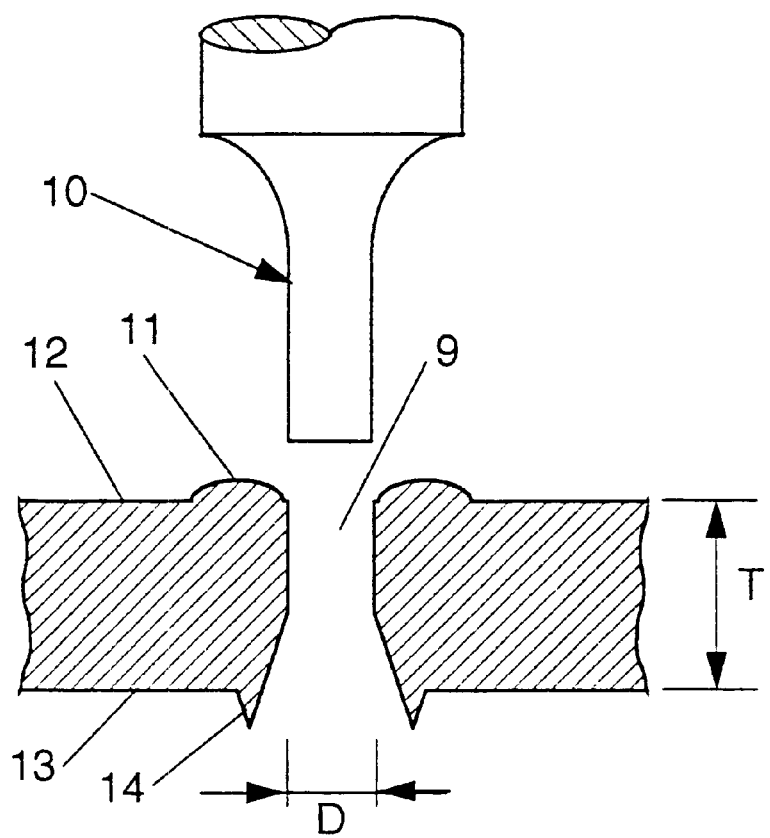
FIG. 4 is a fragmentary, part cross section, part elevational view a die used in a conventional method for making a hole in a plate member.

In FIG. 1, a prepared hole 16 (shown in phantom lines) is formed in a raw plate material which subsequently becomes the plate 65. A punch (not shown) is used in a manner similar to that described with respect to a conventional hole forming method (FIG. 4). The prepared hole 16 has a shape generally as shown in phantom lines in FIG. 1.

The prepared hole 16 has a diameter that is larger than the desired diameter of the oil passing hole 69, as is indicated in FIG. 1. When the thickness T and the diameter D of the oil passing hole 69 are, for example, 1.6 mm and 0.8 mm, respectively, the diameter d of the prepared hole 16 should be approximately 0.9 mm. Since the diameter of the punch for the prepared hole is large compared with the thickness of the plate, the amount of force per square inch applied to the punch is relatively low. Therefore, the punch used to form the prepared hole 16 is not easily broken and may be used for longer periods of time, when compared to the conventional punch depicted in FIG. 4.

As shown in FIG. 1, the prepared hole 16 extends along the full thickness of the plate 65 keeping roughly the predetermined diameter d. As can be seen in FIG. 1, edge parts 18 and 19 have a rounded cross section adjacent to the prepared hole 16. For the purposes of the present invention, such material or flash which forms the rounded portions of the edge parts 18 and 19 is to be expected and is not detrimental to effectiveness of the methods of the present invention. In other words, the high accuracy is not required for the formation of the prepared hole 16.

A Second Step In The Formation Of The Hole

The above mentioned prepared hole 16 is next changed by using the punch 15 to form the oil passing hole 69. The punch 15 includes in a body a column-like body 20, a small column part 21 which projects from the end of the column-like body 20 and has a column-like shape with a small diameter. A guiding part 22 projects from the center of the end surface of the small column part 21 and has a cylindrical shape with a diameter smaller than the diameter of the small column part 21.

The diameter of the guiding part 22 approximately equal to the desired diameter D of the oil passing hole 69 to be formed. The diameter of the small column part 21 is larger than the diameter d of the prepared hole 16. The lower end surface 23 of the small column part 21, in other words, the annular surface around the base part of the guiding part 22 extends in a radial direction (in a direction parallel to the upper surface 25 of the plate 65). The annular lower end surface 26 of the punch body 20 extends in radial directions around the base part of the small column part 21 forming an annular shape.

In addition, a lower bed 27 supports the lower surface 28 of the plate 65 during deformation by force being applied to the punch 15 in a downward direction, relative to FIG. 1. The lower bed 27 includes a supporting surface 30 which supports the lower surface 28 of the plate 65. The lower bed 27 also includes a column-like protrusion 31 extending from the supporting surface 30. The diameter of the protrusion 31 is equal to or generally the same diameter as that of the diameter of the punch small column part 21, but is larger than the diameter d of the prepared hole 16.

The oil passing hole 69 is made using the above described device as follows.

Figure 2:
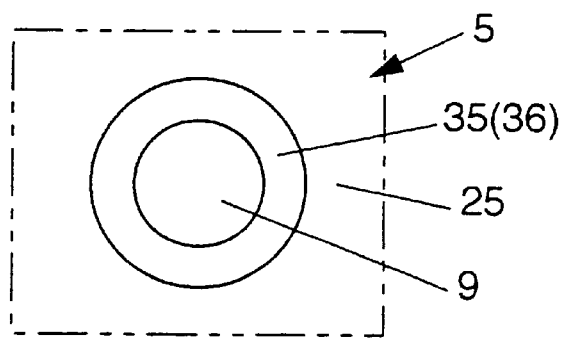
FIG. 2 is an elevational top view of the oil passing hole formed in the plate in accordance with the method represented in FIG. 1.
Figure 3:
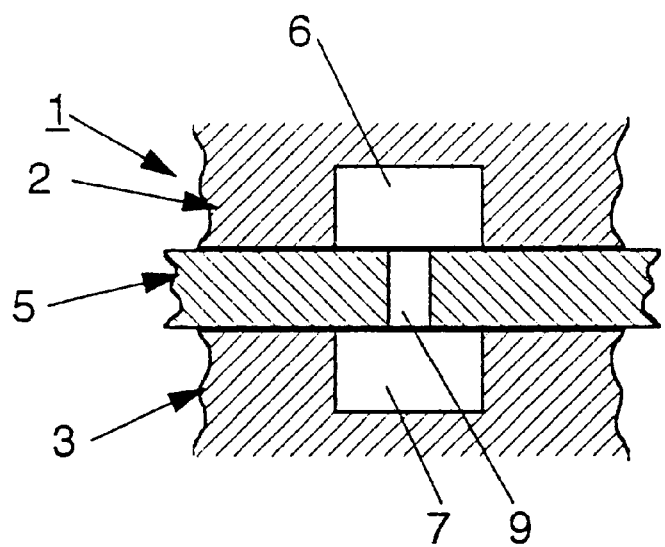
FIG. 3 is a fragmentary cross section view of a portion of valve body which employs a plate having a hole formed therein.

The plate 65 with the prepared hole 16 is placed on the lower bed 27, and the punch 15 is lowered toward it. Consequently, the guiding part 22 may extend into the prepared hole 16 because the diameter of the guiding part 22 is larger than the diameter of prepared hole 16, and subsequently, the small column part 21 and the protrusion 31 press the edge parts 18 and 19 of the prepared hole 16. As force is applied on the edge parts 18 and 19 by the small column part 21 and the protrusion 31, the edge parts 18 and 19 undergo plastic deformation. Due to the plastic deformation, an annular shaped portion 32 is formed on the plate 65 between the small column part 21 and the protrusion 31. In the formation of the portion 32, the diameter of the prepared hole 16 is reduced such that the portion 32 is forced to surround and engage the circumferential surface of the guiding part 22. As the result, the oil passing hole 69 with a predetermined size and shape is formed precisely. As shown in FIG. 1 and FIG. 2, around both end of the oil passing hole 69, annular and shallow concave parts 35 and 36 are formed as a result of deformation by the small column part 21 and the protrusion 31. As a result, there are no swollen parts formed such as those discussed with respect to the conventional plate shown in FIG. 4. Any such flash near the lower end of the prepared hole 16, are deformed and are smoothed out to form generally smooth surfaces on the various portions of the plate 65.

It should be appreciated that the various dimensions of, for instance, the depths of the concave parts 35 and 36 are drawn larger than the actual proportional sizes with respect to the thickness T in order to better illustrate the effects of the present invention.

In the steps to make a hole with a desired size of diameter, when the material around the prepared hole 16 of the plate 65 is moved as a result of deformation, the moved material does not necessarily completely conform to the shape of entire surface of the guiding part 22. Rather, it is desirable for there to be contact with the guiding part 22 at least all the way around the outer circumferential surface to define the hole 69, but there does not need to be contact throughout the axial length of the guiding part 22. However, the dimensions of the prepared hole 16 and the punch 15 are predetermined so that the portion 32 at least makes contact about the entire diameter of the circumferential surface of the guiding part 22 to define the oil passing hole 69.

According to the present invention as described above, the prepared hole 16 is made in the plate 65, and by deforming the end parts 18 and 19 of the prepared hole 16 the intermediate part of the prepared hole 16 is pressed toward the guiding part 22 with to a predetermined size and shape to form the oil passing hole 69. Therefore, the oil passing hole 69 is formed in a high accuracy, and the formation of a swollen part and flash at the edge thereof can be prevented. Although there is a possibility that a swollen part is formed around the oil passing hole 69 on the concave parts 35 and 36, the swollen part does not have any effect on the upper and lower surfaces 25 and 28 of the plate 65 and does not cause any leakage problem when used in a valve body of, for instance, an automatic transmission. In other words, the flatness of the upper and lower surfaces 25 and 28 of the plate 65 is maintained during the process and desireable liquid-sealing characteristics are maintained when a valve body is assembled including the plate 65.

According to the present invention, a prepared hole is made in a plate beforehand, and subsequently, a material around the prepared hole is deformed and forced against a guiding part, where the guiding part is inserted in the prepared hole, giving the subsequently formed hole a desired shape. Using the method as described, a hole with a precise size can be obtained.

The Effect Of The Invention

In the method to make a hole in a plate according to the present invention, when a prepared hole is made, a punch with a relatively large diameter can be used. Therefore, the undesirable breakage of the punch is unlikely.

Second Embodiment

Figure 5:
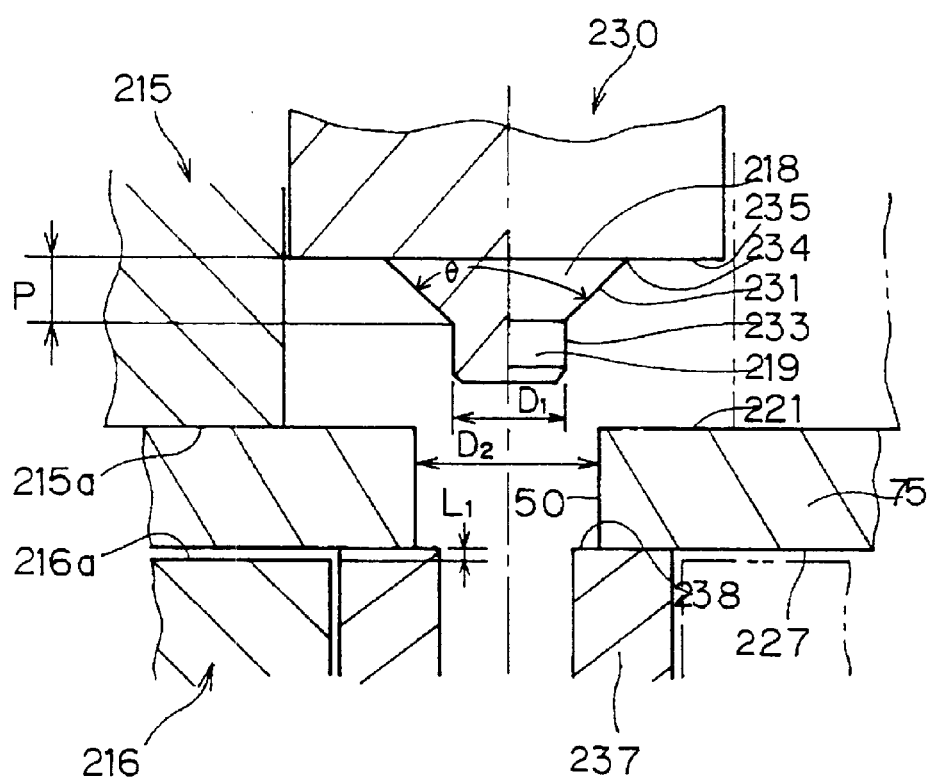
FIG. 5 is a fragmentary, part cross section, part elevational view showing a punch and plate used in a method for forming a hole in the plate in accordance with a second embodiment of the present invention.
Figure 7:
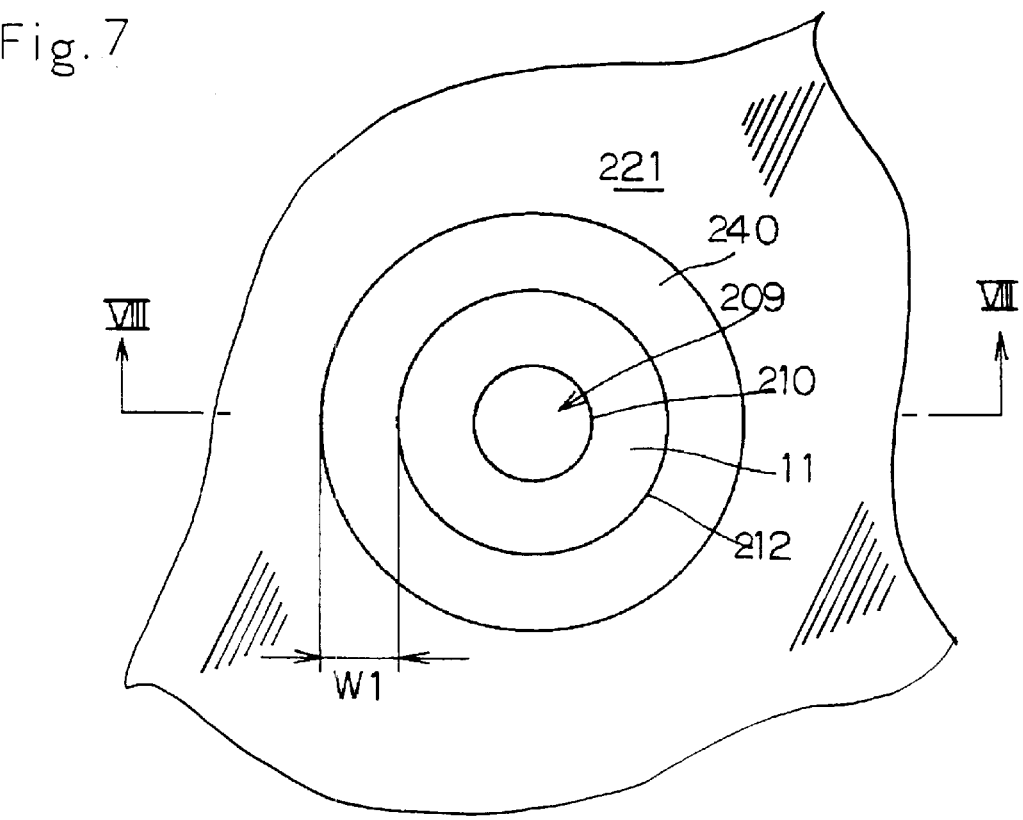
FIG. 7 is an elevational view of a separate plate with a hole made by the method for forming the hole in accordance with the second embodiment of the present invention.
Figure 8:
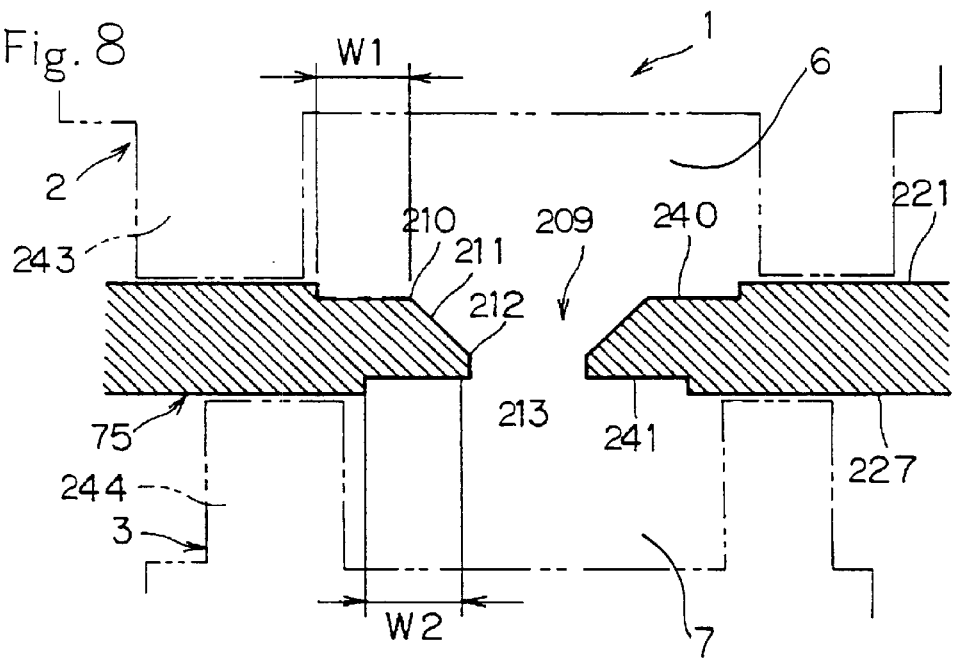
FIG. 8 is a fragmentary cross section view of a valve which includes the separate plate made in accordance with the second embodiment of the present invention, where the separate plate view is taken along the line VIII—VIII in FIG. 7.

A second embodiment of the present invention is depicted in FIG. 5, where a raw material is shown and used to form a separate plate 75. The separate plate 75 is first formed with has a round prepared hole 50. The prepared hole 50 is made by a conventional press working or punching process. A diameter D2 of the prepared hole 50 is formed so as to be larger than a diameter D1 which corresponds to a finished oil passing hole 209 that is depicted in FIGS. 7 and 8.

Figure 15:
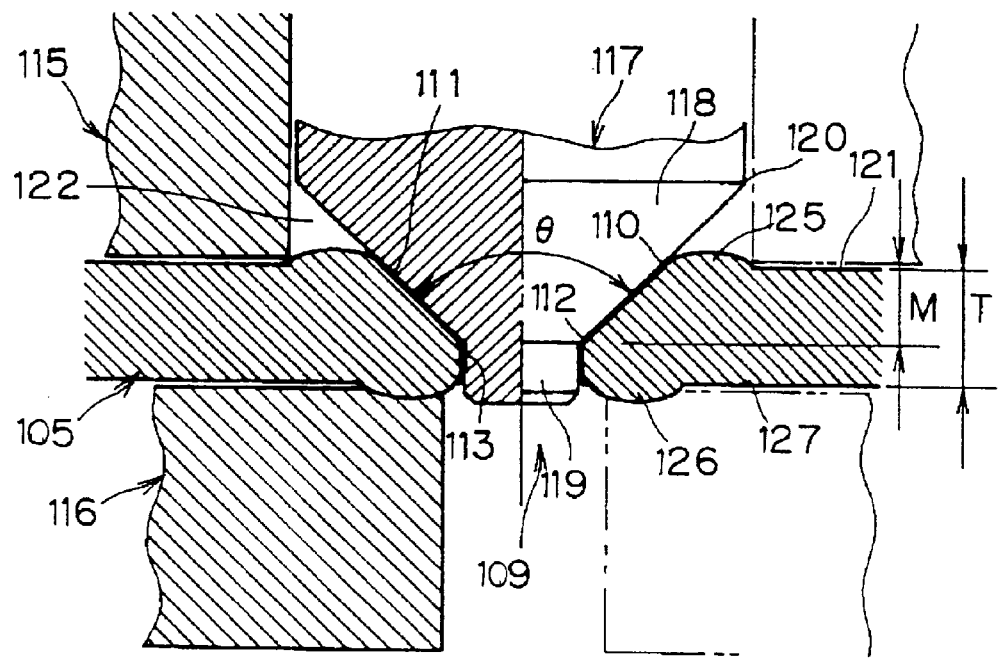
FIG. 15 is a fragmentary part cross section, part elevational view showing a conventional apparatus for forming a hole in a conventional separate plate.

A die plate 215 used for press working the plate 75, as is shown in FIG. 5. In some respects, the die plate 215 is similar to the die plate 115 depicted FIG. 15. A punch 230 is used to form the hole 209 and is similar to the punch 117 shown in FIG. 15, but has additional features, as described below. The punch 230 is used to form the hole 209 and adjacent surfaces in the plate 75 depicted in FIGS. 6, 7 and 8 and described below. The punch 230 includes a taper part 218 which has a taper face 231 that has a conical contour for forming a conical shaped surface, hereinafter referred to as a taper face 211, in the plate 75. The punch 230 also includes a cylinder like protrusion 219 which has a cylinder face 233 which is assists in the formation of a cylinder face 213 of the plate 75.

Figure 6:
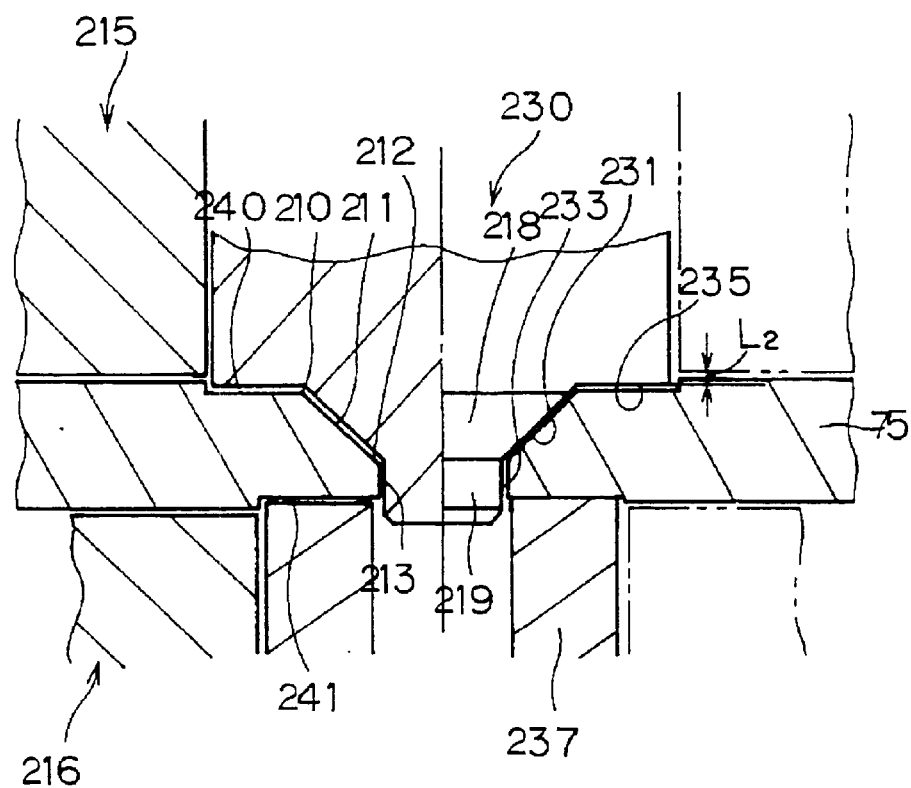
FIG. 6 is a fragmentary, part cross section, part elevation view showing a step in the method for forming the hole in the plate in accordance with the second embodiment of the present invention.

To form the hole in the plate 75 shown in FIG. 6, the punch 230 is forced downward against the upper surface of the plate 75. Various other members, described below, work together with the punch 230 to form the hole in the plate 75.

The punch 230 may be formed with the approximate relative dimensions as depicted in FIG. 5, but it should be understood that some of the relative dimensions of the various portions of the punch 230 have been exaggerated in order to more clearly describe the various aspects of the present invention. Therefore, the present invention is not limited to the specific dimensions or relative dimensions of the punch 230 depicted in FIG. 5.

The diameter of an edge 234 at the radial outermost portion of the taper face 231 is slightly smaller than the diameter of the large diameter edge 210 of the taper face 211, and the height (depth) P of the taper face 231 is a little smaller than that of the taper face 211. The annular end face 235 located outside the large diameter edge 234 in a radial direction extends in a radial direction from the large diameter edge 234, in other words, parallel with the upper face 221 of the separate plate 75. The end face 235 can move by the length L2 beyond the lower end face 215a of the die plate 215 during press working, as is shown in FIG. 6.

In addition, in the embodiment shown in FIGS. 5 and 6, a cylinder-like die 237 is inserted in a hole of the lower die plate 216. The die 237 has an annular upper end face 238 which extend parallel to the lower surface 227 of the separate plate 75. The upper end face 238 of the die 237 is moved upward, relative to the orientation of FIGS. 5 and 6, by the length L1 above the upper end face 216a of the die plate 216 during the hole forming process, as indicated in FIG. 6.

The diameter D1 of the column-like protrusion 219 is generally equal to the diameter of the finished oil passing hole 209 (FIGS. 7 and 8).

The oil passing hole 209 is formed using the above mentioned dies and punch as follows. While keeping a raw material of the separate plate 75 interposed between the upper and lower die plates 215 and 216 as shown in FIG. 5, the punch 230 is lowered. Then, the taper face 231 of the taper part 218 deforms the prepared hole 50 plastically, as shown in FIG. 6. The material moved by the plastic deformation of the plate 75 moves such material toward and against the taper face 231 of the taper part 218 and the cylinder surface 233 of the protrusion 219. As the result, the shape of the oil passing hole 209 is made to include the taper face 211 and the cylinder face 213. Thus, the taper face 211 and the cylinder surface 213 are formed so as to have a predetermined size and shape.

As described above, the first step in the hole making process of the present invention includes the formation of the prepared hole 50 with a diameter D2. Next, the material around the prepared hole 50 is deformed and moves to form the separate hole 209 having the desired shape and adjacent surfaces, as depicted in FIG. 6.

The second embodiment of the present invention includes the taper surface 211. However, the present method can be applied to the formation of holes with alternative shapes, as is described below.

In the above described press working steps, the end face 235 of the punch 230 presses the upper surface 221 around the oil passing hole 209. Therefore, a swelling on the upper surface 221 is prevented, which is caused by a movement of the material accompanying a formation by the taper face 231. In addition, during the above mentioned press working, the upper end face 238 of the die 237 presses the lower surface 227 around the oil passing hole 209. Therefore, the generation of a swelling on the lower surface 241 owing to the movement of the material is also prevented.

When the taper face 211 and the cylinder surface 213 are formed against the taper face 231 and the cylinder surface 233, the size and shape of the taper face 211 and the cylinder surface 213 are a result, in part, of contact between the end face 235 and the upper surface 221 and the upper end face 238 and the lower surface 227. In other words, it is possible to form the taper face 211 and the surface 213 on the taper face 231 and the cylinder surface 233 because of the surfaces 235 and 216a restrict the plastic flow of material forcing deformation to occur radially inward toward the surfaces 231 and 233 of the punch 230. As the result, the movement of material in terms of the volume of material moved, is always generally constant, and the accuracy of the size of each part is improved, compared with the conventional method shown in FIG. 15, in which the size and the shape depends greatly on a stroke of the punch 217.

As a result of the above hole forming process, the separate plate 75 thus processed has a concave part 240 with the width W1 extending annularly on the upper surface 221 and a concave part 241 with the width W2 extending annularly on the lower surface 227, as shown in FIGS. 7 and 8.

In a valve 1 in which a sealing means such as a gasket is not employed, as shown in FIG. 8, the widths W1 and W2 are positioned such that the upper surface part 240 and the lower surface part 241 are slightly separated from partition walls 243 and 244 of oil passages 6 and 7, respectively, so that sealing properties are not impeded.

Figure 9:
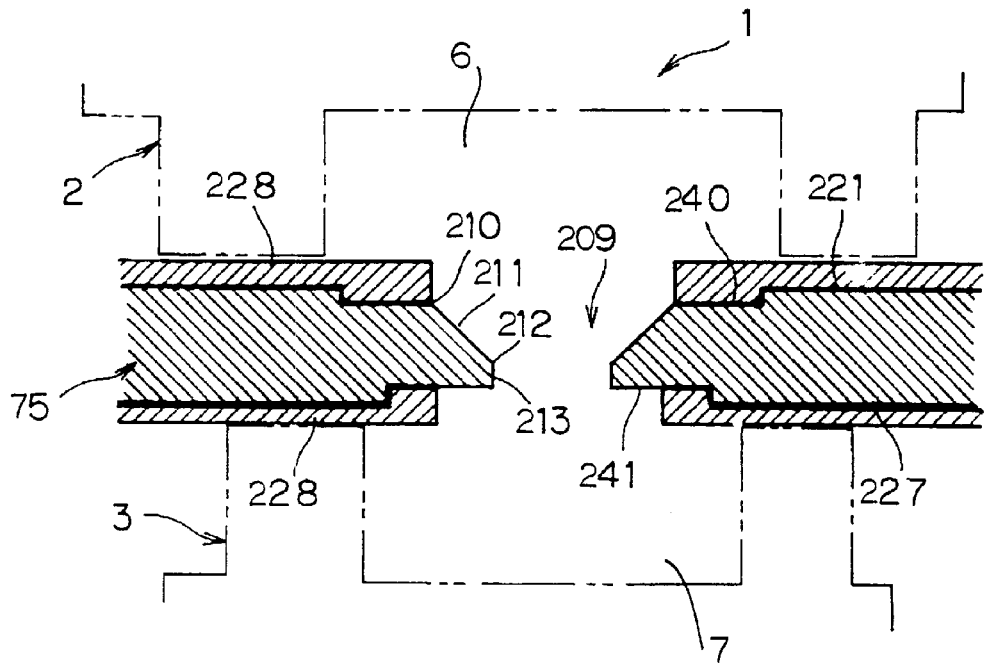
FIG. 9 is a fragmentary cross section view of another valve which includes a separate plate made in accordance with the second embodiment of the present invention.

In a valve for which a gasket 228 is used, as shown in FIG. 9, the widths W1 and W2 and the dimensions of adjacent surfaces are pre-determined such that the deformed gaskets adhere to the concave parts 240 and 241 in order to obtain a desired sealing property.

Figure 16:
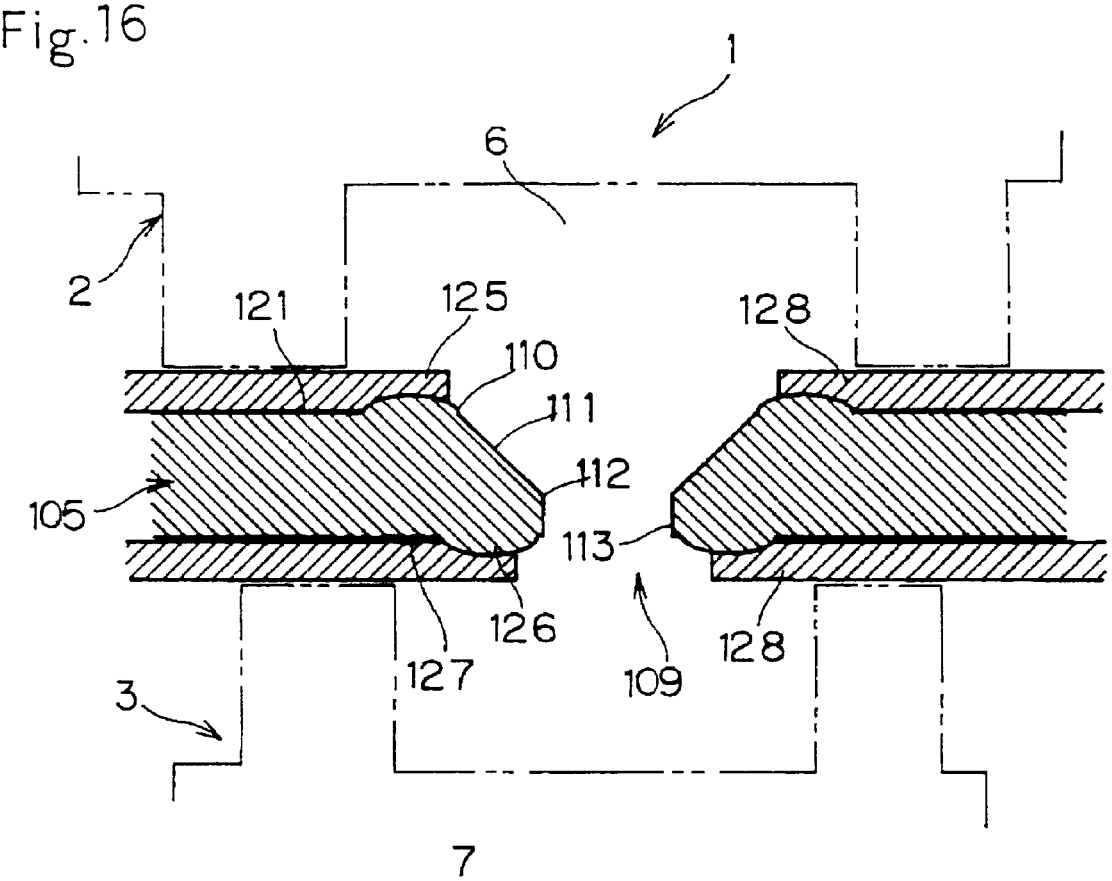
FIG. 16 is a fragmentary cross section view of another valve which employs the conventional separate plate depicted in FIG. 15.

The sealing property of the gasket 228 is hardly reduced by the concave parts 240 and 241. The depicted configuration in FIG. 9 exhibits sealing properties that are an improvement over the sealing properties of the separate plate 105 which includes a swelling part 126 as described previously with respect to FIG. 16.

In the present invention, as depicted in FIG. 9, the concave parts 240 and 241 having a reduced or almost negligible depth also exhibit good sealing properties.

Figure 10:
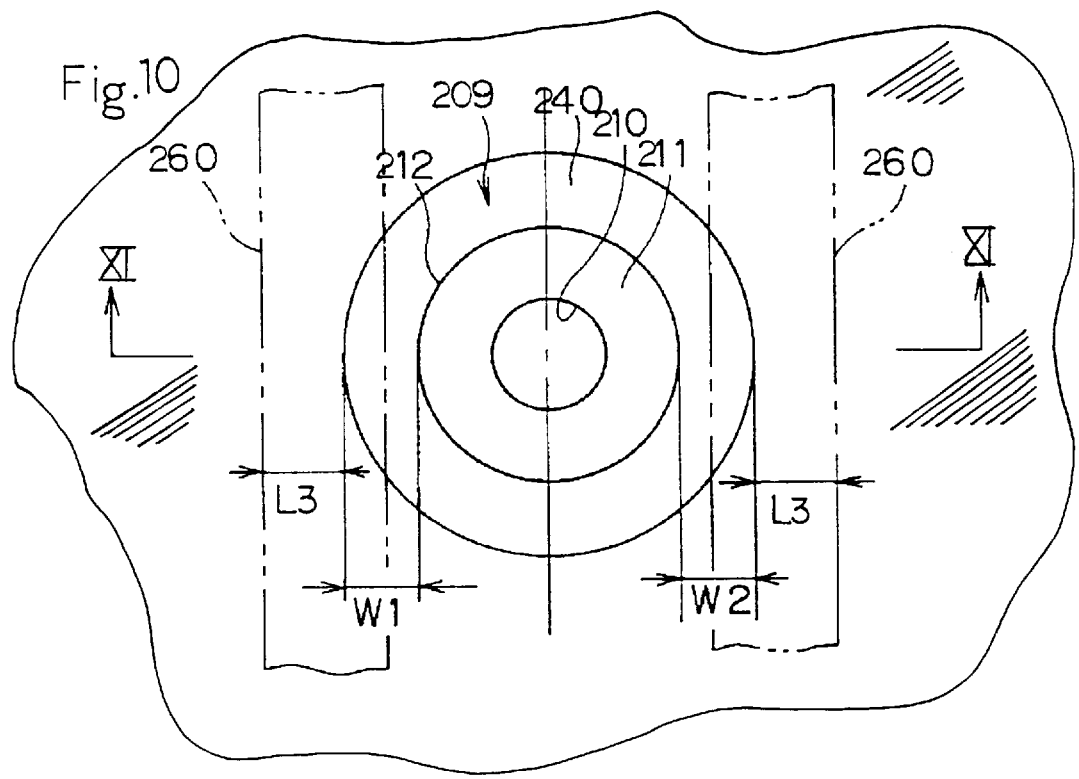
FIG. 10 is an elevational top view of the separate plate depicted in FIG. 9 showing an oil passing hole formed in the separate plate.
Figure 11:
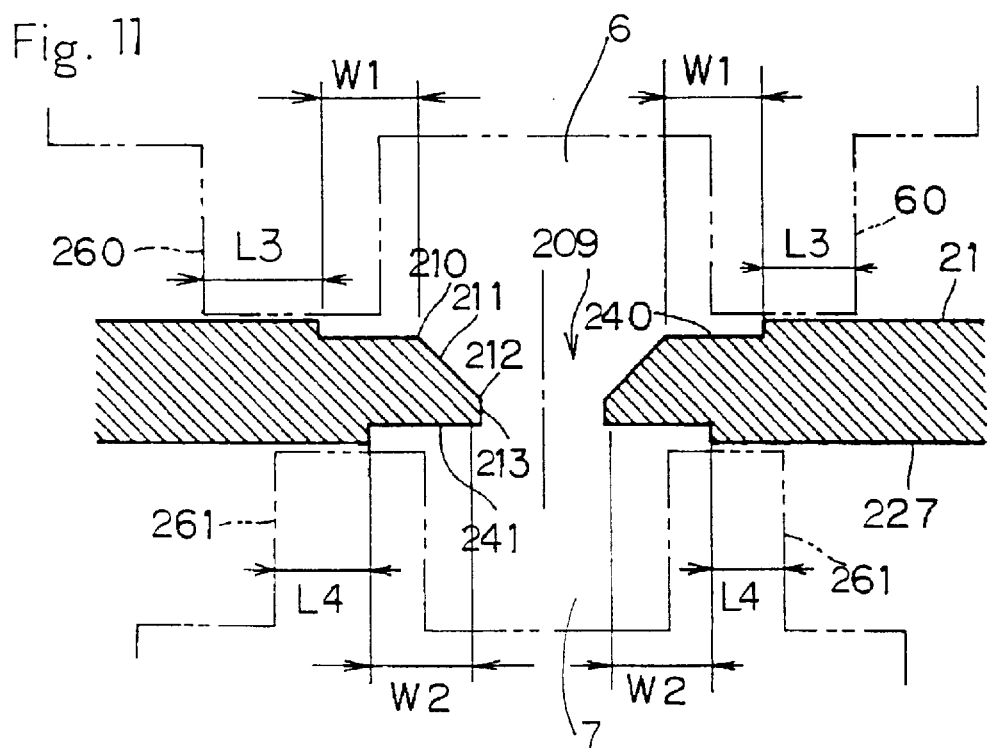
FIG. 11 is a fragmentary cross section view of the separate plate taken along the line XI—XI in FIG. 10.

The relations between the concave parts 240 and 241 and the partition walls 243 and 244 of the bodies 2 and 3 is described with specific reference to FIGS. 10 and 11 as follows. The concave parts 240 and 241 have a diameter sized such that the concave parts 240 and 241 can be located inside the partition walls 243 and 244, respectively. The distance L3 and L4 between the outer circumferential edges of the concave parts 240 and 241 and the outer circumferential edges of the partition walls 243 and 244, respectively, need to be at least 1 mm to keep a good sealing property.

Figure 14:
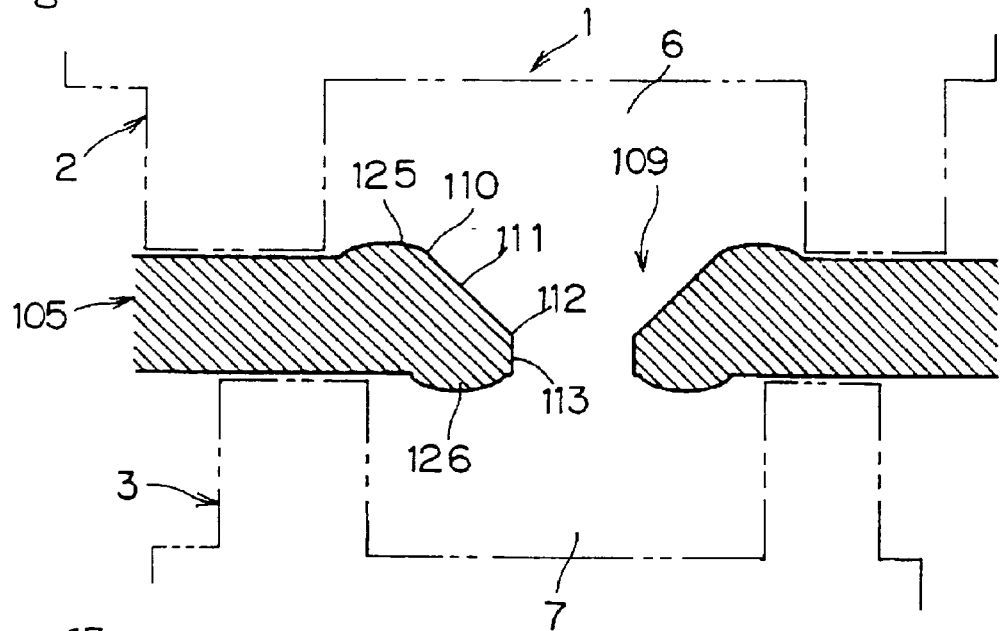
FIG. 14 is a fragmentary cross section view of a valve which employs a conventional separate plate.

According to the present invention as described above, since the circumference of the oil passing hole 209 is pressed during press working process (the hole forming process), the generation of the swelling parts 125 and 126 (FIG. 14) is prevented. Therefore, the oil passing hole 209 and adjacent surfaces can be formed more precisely so as to have a predetermined size and shape. In addition, such a process can be performed by press working, leading to improved productivity in the manufacturing process.

The oil passing hole 209 formed as described above gives an excellent effect when an open angle Θ of the taper face 211 (see FIGS. 5 and 8) is more than 80° and the ratio (M/T) of the depth M of the taper face 211 against the thickness T of the separate plate 75 is more than 0.5. But, the present invention is not limited to the above mentioned content.

Third Embodiment

Figure 12:
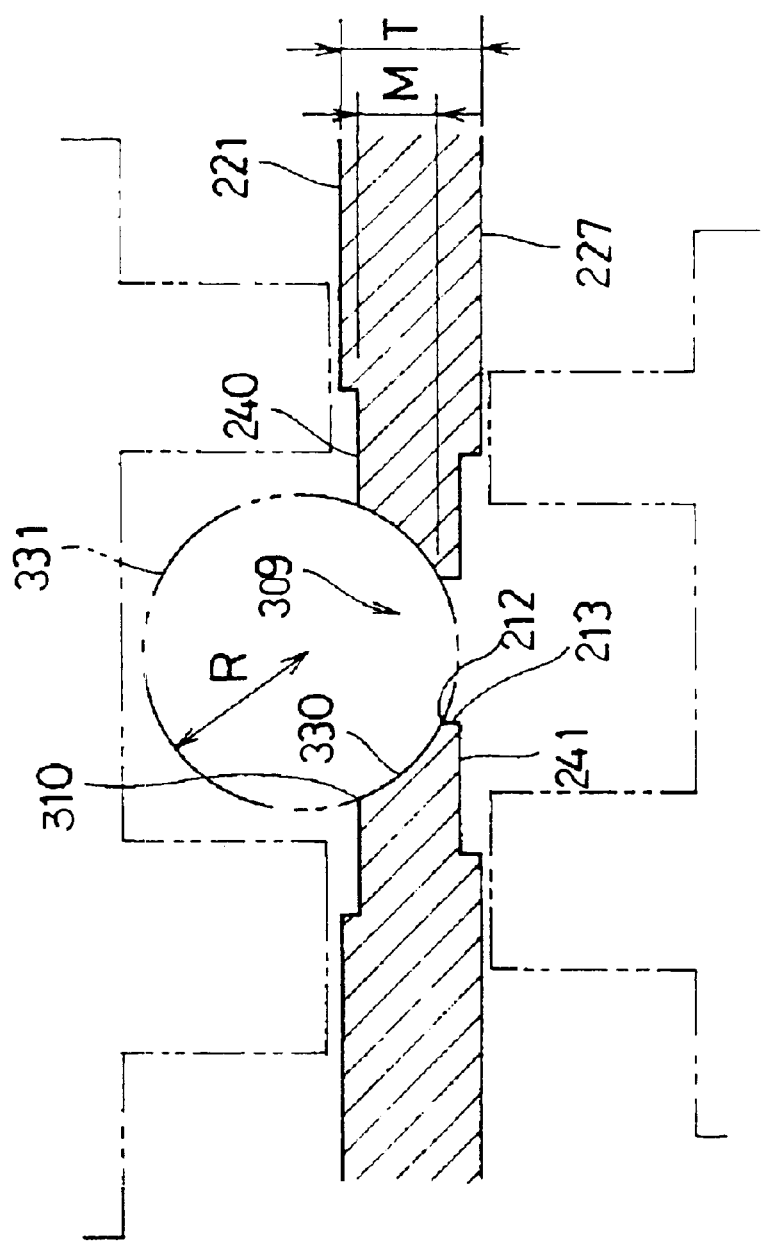
FIG. 12 is a fragmentary cross section view of a plate in accordance with a third embodiment of the present invention.

A third embodiment of the present invention is shown in FIG. 12. In FIG. 12, an oil passing hole 309 is formed with a spherical face 330 instead of a taper face as shown in FIG. 12. The spherical face 330 has an edge 312 which has a diameter smaller than that of an edge 310. The spherical face 330 has a smooth concave surface and coincides with a portion of a surface of a sphere 331 with a radius R. The formation of the hole 309 requires a punch similar to the punch 230, although for the formation of the hole 309 the punch 230 is modified such that the face 231 is replaced with a spherical surface having a radius R similar to the ball 331. Thus, in a valve which employs a plate formed with the hole 309, a ball such as the ball 331 may be inserted into the hole 309 and serve as a check valve for fluid flow through the hole 309.

Fourth Embodiment

Figure 13:
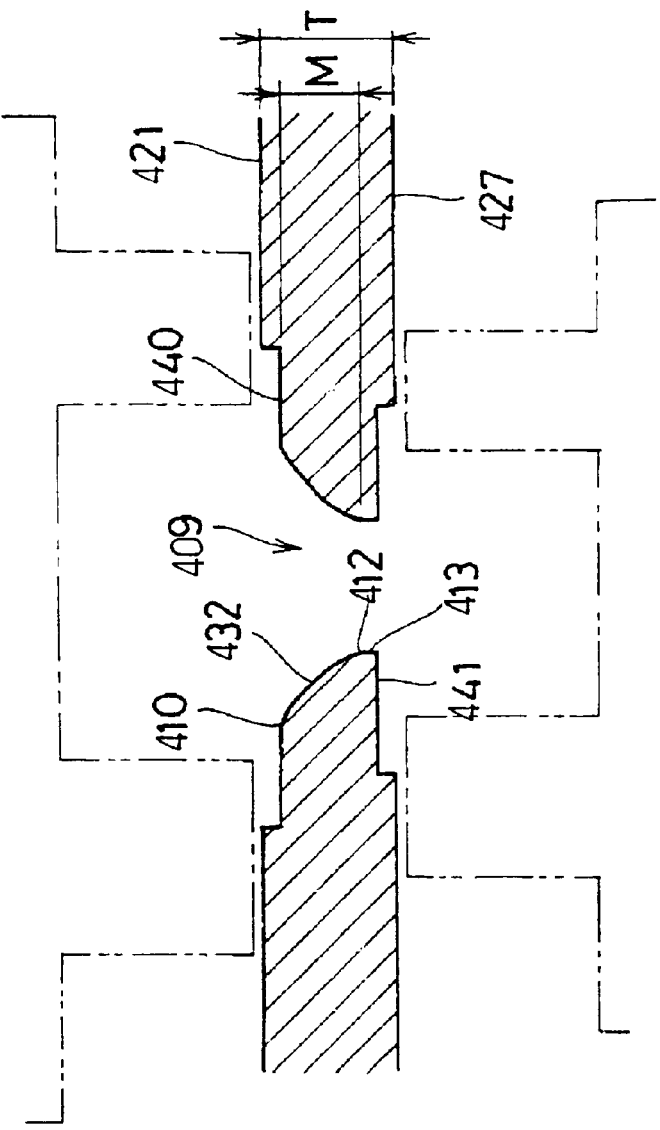
FIG. 13 is a fragmentary cross section view of a plate in accordance with fourth embodiment of the present invention.

The present invention can also be applied to an oil passing hole 409 which has a curved face 432 instead of a taper face, as shown in FIG. 13. The curved face 432 has an edge 412 which has a diameter smaller than that of an edge 410, and is an inclined face formed around the cylinder face 413. The spherical face 430 has a smooth convex surface. When the present invention is applied to making a hole with such an inclined face, the effect similar to that of the above mentioned embodiment can be obtained. The formation of the hole 409 requires a punch similar to the punch 230, although for the formation of the hole 409 the punch 230 is modified such that the face 231 is replaced with an annular curved contoured surface that is complementarily shaped to form the shape of the hole 309.

The Effect Of The Invention

Since the generation of a swelling portion on a plate is prevented during formation of an inclined face of a hole in a plate, the accuracy of the plate made by press working to regulate a fluid flow is improved.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A method for making a hole in a plate, the method comprising the steps of:

providing a first hole in a plate material, the first hole having a first diameter;

deforming portions of the plate material surrounding the first hole with a punch such that the portions of the plate material surrounding the first hole plastically flow radially inward with respect to the first hole, thus forming a second hole having a second diameter, the second diameter being smaller that the first diameter, wherein, a guiding part of the punch is inserted into the first hole, the guiding part of the punch having a cylindrical shape having a diameter generally corresponding to said second diameter such that as the portions of the plate material surrounding the first hole plastically flow radially inward, the portions of the plate material contact and surround the guide part to form a portion of the second hole, and the plate material surrounding the guiding part are formed with an annular spherically shaped surface having a generally concave shape and the punch is formed with a complimentary spherical surface about the guiding part for forming the annular spherically shaped surface.

2. The method as set forth in claim 1, wherein the diameter of the guiding part is less than 50% of a thickness of the plate material.

3. The method as set forth in claim 1, wherein in said deforming step an annular portion of said plate material is deformed such that a thickness of the plate material of the annular portion is reduced forming an annular indentation about the previously mentioned portions of the plate material, the annular indentation being formed by a column part that is concentrically formed radially outward from the guiding part on the punch.

4. A method for making a hole in a plate, the method comprising the steps of:

providing a first hole in a plate material, the first hole having a first diameter;

deforming portions of the plate material surrounding the first hole on a first side of a plate with a punch such that the portions of the plate material surrounding the first hole plastically flow radially inward with respect to the first hole, thus forming a second hole having a second diameter, the second diameter being smaller that the first diameter;

forming a first recess on the first side of the plate about the second hole and concentric with the second hole with the punch simultaneously with said deforming step, the punch having an outer diameter corresponding to the first recess for forming the first recess, the first recess extending to the second hole;

forming a second recess on a second side of the plate, the second recess being generally concentric with the first recess and the second hole, where an outer diameter of the first recess is larger than an outer diameter of the second recess;

wherein in said deforming step, a guiding part of the punch is inserted into the first hole a distance corresponding to at least an entire thickness of the plate material, the guiding part of the punch having a cylindrical shape having a diameter generally corresponding to the second diameter such that as the portions of the plate material surrounding the first hole plastically flow radially inward, the portions of the plate material contact and surround the guide part to form a portion of the second hole; and wherein in said deforming step portions of the plate material surrounding the guiding part are formed with a curved annular shaped surface having a generally rounded shape and the punch is formed with a complimentary rounded surface about the guiding part for forming the curved annular shaped surface.

5. A punch for forming a hole in a plate, said punch comprising;

a generally cylindrically shaped pressing part having an annular flat surface at a bottom portion thereof;

a guiding part having a generally cylindrical shape extending downward form said pressing part and being concentric with said pressing part;

wherein, said pressing part is configured to engage a surface of a plate member adjacent to a pre-exiting hole having a first diameter and said guiding part is configured for insertion into the pre-existing prepared hole such that in response to force being applied by said pressing part onto the plate member, portions of the plate member are deformed and plastically flow radially inward into engagement with said guiding part forming a hole having a second diameter smaller than the first diameter; and a spherical shared portion formed about said guiding part, a surface of said spherical shaped portion extending from said guiding part to said pressing part such that said spherical shaped portion is configured to form a complimentary spherical shaped surface on the plate member radially outside the hole having the second diameter.

6. A punch for forming a hole in a plate, said punch comprising:

a generally cylindrically shaped pressing part having an annular flat surface at a bottom portion thereof;

a guiding part having a generally cylindrical shape extending downward from said pressing part and being concentric with said pressing part;

wherein, said pressing part is configured to engage a first surface of a plate member adjacent to a pre-existing hole having a first diameter and said guiding part is configured for insertion into the pre-existing hole by a distance at lest a thickness of the plate member, such that in response to force being applied by said pressing part onto the plate member portions of the plate member are deformed and plastically flow radially inward into engagement with said guiding part forming a second hole having a second diameter smaller than the first diameter, and simultaneously a first recess concentric with the second hole is formed about the second hole by said pressing part, the first recess extending to the hole, the plate member being supported on a second surface by a cylindric die positioned to engage the second surface of the plate member for forming a second recess on the second surface, the diameter of the second recess being smaller that a diameter of the first recess; and a rounded annular shaped portion formed about said guiding part, a surface of said rounded annular shaped portion extending from said guiding part to said pressing part such that said rounded annular shaped portion is configured to form a complimentary rounded shaped annular surface on the plate member radially inside the first recess and radially outside the second hole having the second diameter.

7. A method for making a hole in a plate, the method comprising the steps of:

providing a first hole in a plate material, the first hole having a first diameter;

deforming portions of the plate material surrounding the first hole with a punch such that the portions of the plate material surrounding the first hole plastically flow radially inward with respect to the first hole, thus forming a second hole having a second diameter, the second diameter being smaller that the first diameter, wherein, a guiding part of the punch is inserted into the first hole, the guiding part of the punch having a cylindrical shape having a diameter generally corresponding to said second diameter such that as the portions of the plate material surrounding the first hole plastically flow radially inward, the portions of the plate material contact and surround the guide part to form a portion of the second hole, and the plate material surrounding the guiding part is formed with a predetermined shaped surface and a portion of the punch adjacent to the guide part is formed with a complimentary surface having a shape corresponding to the predetermined shape, and another portion of the punch further being formed with a cylindrical shape such that an annular indentation is formed on a first surface of the plate material about the second hole.

8. The method as set forth in claim 7, wherein the predetermined shaped surface has an annular spherically having a generally concave shape.

9. The method as set forth in claim 7, wherein the predetermined shaped surface has an annular spherically having a generally convex shape.

10. The method as set forth in claim 7, wherein the predetermined shaped surface has a conical shape.

11. The method as set forth in claim 7, wherein in said deforming step, a second punch engages a second surface of the plate material, the second punch having a cylindrical portion larger than the first hole for forming a second annular indentation on the second surface of the plate material, the second annular indentation being smaller than the annular indentation formed on the first surface.

12. The method as set forth in claim 11, wherein the predetermined shaped surface has an annular spherically having a generally concave shape.

13. The method as set forth in claim 11, wherein the predetermined shaped surface has an annular spherically having a generally convex shape.

14. The method as set forth in claim 11, wherein the predetermined shaped surface has a conical shape.

* * * * *